United States Patent [19]

Andersen et al.

[11] Patent Number: 4,923,665

[45] Date of Patent: May 8, 1990

[54] METHOD OF IMPROVING CHARACTERISTICS OF A MOULDED BODY

[75] Inventors: Arne Andersen; Hans Bache, both of Klokkerholm, Hjallerup, Denmark

[73] Assignee: Aktieselskabet Aalborg Portland-Cement-Fabrik, Aalborg, Denmark

[21] Appl. No.: 287,706

[22] Filed: Dec. 19, 1988

Related U.S. Application Data

[63] Continuation of Ser. No. 518,302, Jun. 29, 1983, abandoned, which is a continuation of Ser. No. 910,354, Sep. 22, 1986, abandoned.

[30] Foreign Application Priority Data

Oct. 30, 1981 [DK] Denmark ............................ 4816/81

[51] Int. Cl.[5] ............................................ B29C 43/22

[52] U.S. Cl. .................................. 264/259; 106/38.2; 106/89; 106/90; 106/97; 106/98; 264/60; 264/62; 264/122; 264/517; 428/225; 428/329; 428/331; 428/450; 428/454; 428/469; 428/697; 428/702

[58] Field of Search ............... 428/225, 329, 331, 450, 428/454, 469, 697, 702; 264/60, 62, 122, 259, 517; 106/38.2, 89, 90, 97, 98

[56] References Cited

U.S. PATENT DOCUMENTS 3,405,212 10/1968 Fraser et al. ........................ 264/221

FOREIGN PATENT DOCUMENTS 21681 7/1981 European Pat. Off. .

21682 7/1981 European Pat. Off. .

918859 of 0000 Fed. Rep. of Germany .

2304157 of 0000 Fed. Rep. of Germany .

2393778 of 0000 France .

2426032 of 0000 France .

910631 11/1962 United Kingdom ................ 264/256

2018737A 10/1979 United Kingdom .

1564611 4/1980 United Kingdom .

*Primary Examiner*—Marion C. McCamish

*Attorney, Agent, or Firm*—Bryan, Cave, McPheeters & McRoberts

[57] ABSTRACT

The characteristics of surfaces of bodies made from a basic material (22) which is mouldable at low temperatures, such as concrete or concrete-like materials are improved by applying a layer of metal (12) to one or more surface parts thereof. The metal layer may be applied by moulding the basic material, optionally with reinforcements (23) against a prefabricated metal member (12) which may be a metal layer formed on a surface (21) of a model or a mould (20) whereby a metal-coated tool for casting or shaping articles corresponding to the model or mould may be made from the basic material.

The mouldable material is, in particular, a material which in its cured state comprises a coherent matrix, the matrix comprising (A) homogenously arranged solid particles of a size of from about 50 Å to about 0.5 μm, or a coherent structure formed from such homogenously arranged particles, and (B) densely packed solid particles having a size of the order of 0.5–100 μm and being at least one order of magnitude larger than the respective particles stated under (A), or a coherent structure formed from such densely packed particles, the particles A or the coherent structure formed therefrom being homogenously distributed in the void volume between the particles B, the dense packing substantially being a packing corresponding to the one obtainable by gentle mechanical influence on a system of geometrically equally shaped large particles in which locking surface forces do not have any significant effect, optionally additionally comprising, embedded in the matrix, (C) compact-shaped solid particles of a material having a strength exceeding that of ordinary sand and stone used for ordinary conrete. Example of such a material is one in which the particles A are silica dust having a specific surface of about 250,000 cm$^2$/g, the particles B are cement particles, and the bodies C are refractory grade bauxite.

5 Claims, 4 Drawing Sheets

METHOD OF IMPROVING CHARACTERISTICS OF A MOULDED BODY

Figure 1:
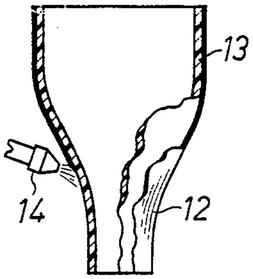

This is a continuation , of U.S. application Ser. No. 518,302, filed June 29, 1983, now abandoned, which is a continuation of U.S. application Ser. No. 910,354, filed Sept. 22, 1986, now abandoned.

The present invention relates to a method of improving the characteristics of a body surface part made from a basic material which is mouldable at low temperature, such as concrete and concrete-like materials. Such basic materials are relatively cheap and may be shaped by pouring or moulding in simple moulds without using elevated temperatures.

In the present context, the term: "a basic material which is mouldable at low temperatures" is intended to designate a material which may be moulded at temperatures which are typically below the temperatures at which metals are moulded. Preferably, the low temperatures is a temperature which does not substantially exceed ambient temperature (e.g., a temperature which preferably does not exceed 100° C., more preferably a temperature which does not exceed 60° C.). At such temperatures many of the disadvantages and hazards involved in high temperature metal moulding will normally be avoided. Typical materials which are mouldable at low temperatures are materials which cure or solidify by chemical reaction, and especially preferred basic materials for the purpose of the present invention are materials which are based on an inorganic binder matrix such as a cement matrix, e.g., concrete and concrete-like materials and, in particular, DSP materials as discussed below, but also materials based upon organic matrices may be of interest, e.g. sand-loaded polymer materials, or materials based on a matrix which is constituted by both organic and inorganic binder principles, such as the CP and DSPP materials discussed below.

Particularly advantages concrete-like materials are high strength materials of the type disclosed in Applicants' International Patent Application No. PCT/DK79/00047, Publication No. WO 80/00959 corresponding to copending U.S. application Ser. No. 243,157 and Applicants' International Patent Application No. PCT/DK81/00048 filed on May 1, 1981, now U.S. Pat. No. 4,588,443 issued May 13, 1986 and claiming priority from Applicants' Danish Pat. applications Nos. 1945/80 of May 1, 1980, 538/81 of February 6, 1981, and 907/81 of Feb. 27, 1981. The contents of these patent applications is incorporated herein by reference. In the following specification and claims, such materials will be referred to as "DSP materials". DSP materials may be shaped in an extraordinarily easy manner, as they show far better casting performance than normal cement-based materials. In spite of this, the DSP materials may attain compressive strengths which are up to 4–6 times the compressive strength of normal cement-based products, in special embodiments even as high as the yield stress of iron (about 260 MPa), and they show far better castability than normal cement-based materials. The surface structure of a model against which the materials are cast is reproduced very precisely. Thus, in precision casting, even fingerprints are reproduced exactly. The DSP materials permit, in a very simple way, casting of other components into the mass of the cement-based material, e.g., components in the form of bars or fibers and the like, to impart toughness to the material. Also, it is possible with great ease to incorporate fine piping or small channels in the material in order to permit liquid and gas transport from or to the shaping zone, and furthermore, components of particularly high hardness such as steel or hard metal bodies may be incorporated. A more detailed explanation of DSP material and other highly valuable concrete-like materials is given below:

DSP materials (DSP designates Densified Systems containing homogeneously arranged ultrafine Particles) are characterized by comprising a matrix which comprises (A) homogeneously arranged solid particles of a size from about 50 Å to about 0.5 μm, or a coherent structure formed from such homogeneously arranged particles, and (B) densely packed solid particles having a size of the order of 0.5–100 μm and being at least one order of magnitude larger than the respective particles stated under (A), or a coherent structure formed from such densely packed particles, the particles A or the coherent structure formed therefrom being homogeneously distributed in the void volume between the particles B, the dense packing substantially being a packing corresponding to the one obtainable by gentle mechanical influence on a system of geometrically equally shaped large particles in which locking surface forces do not have any significant effect, optionally additionally comprising, embedded in the matrix, (C) compact-shaped solid particles of a material having a strength exceeding that of ordinary sand and stone used for ordinary concrete, typically a strength corresponding to at least one of the following criteria:

(1) a die pressure of above 30 MPa at a degree of packing of 0.70, above 50 MPa at a degree of packing of 0.75, and above 90 MPa at a degree of packing of 0.80, as assessed (on particles of the material having a size ratio between the largest and smallest particle substantially not exceeding (4) by the method described in International patent application No. PCT/DK81/00048 and European patent application No. 81 103363.8, (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), as assessed by the method described in International Patent Application No. PCT/DK81/00048 and European patent application No. 81 103363.8, (3) a Moh's hardness (referring to the mineral constituting the particles) exceeding 7 and (4) a Knoop hardness (referring to the mineral constituting the particles) exceeding 800, said particles having a size of 100 μm–0.1 m, and optionally (D) additional bodies which have at least one dimension which is at least one order of magnitude larger than the particles A.

Particular examples of the bodies A, B, C, and D appear from the above-mentioned patent applications (in International patent application No. PCT/DK79/00047, Publication No. WO 80/00959, the bodies D of the present application are termed bodies C).

The bodies B are typically particles which cure by partial dissolution in a liquid, chemical reaction in the dissolved phase, and precipitation of a reaction product. In particular, the bodies B are of an inorganic binder such as cement. Often, at least 20% by weight of the bodies B are Portland Cement; it is preferred that at least 50% by weight of the bodies B are Portland cement, and in particular, it is preferred that the particles B essentially consist of Portland cement particles. The bodies B may, in addition, comprise particles selected from fine sand, fly ash, and fine chalk. The bodies A are also particularly particles which cure by partial dissolution in a liquid, chemical reaction in the solution, and precipitation of a reaction product, especially particles which show a substantially lower reactivity than the particles B, or substantially no reactivity. Typically, the bodies A are inorganic bodies of the types disclosed in the above-mentioned patent applications, in particular, e.g., particles of "silica dust"; silica dust normally has a particle size in the range of from about 50 Å to about 0.5 μm, typically from about 200 Å to about 0.5 μm, and is an $SiO_2$-rich material produced as a by-product in the production of silicium metal or ferrosilicium in electrical furnaces. The specific surface area of silica dust is about 50,000–2,000,000 $cm^2/g$, in particular about 250,000 $cm^2/g$.

The bodies A may also, e.g., comprise fly ash, in particular fly ash which has been finely ground, in particular to a specific surface area (Blaine) of at least 5000 $cm^2/g$, in particular at least 7000 $cm^2/g$, and often at least 10,000 $cm^2/g$. The bodies A are normally present in a volume of 0.1–50% by volume, preferably 5–50% by volume, and in particular 10–30% by volume, of the total volume of bodies A + B. In most cases, the most valuable strength properties are obtainable when both the bodies A and the bodies B are densely packed.

The amount of silica dust to secure a dense packing of the silica dust particles depends on the grain size distribution of the silica dust and, to a large extent, on the void available between the densely packed particles B. Thus, a well-graded Portland cement containing additionally 30% of fine spherically shaped fly ash particles will leave a much smaller available void for the silica dust when densely packed than correspondingly densely packed cement in which the grains are of equal size. In systems in which the particles B are mainly Portland cement, dense packing of silica dust would most likely correspond to silica dust volumes from 15 to 50% by volume of particles A+ particles B. Similar considerations apply to systems comprising other types of particles A and B.

Quartz sand may typically be used as particles D.

According to one aspect of the present invention, sand materials are used which are stronger (bodies C) than the sand materials used in ordinary concrete. (Typically, concrete sand used in ordinary concrete consists of ordinary rock such as granite, gneiss, sandstone, flint and limestone comprising minerals such as quartz, felspar, mica, calcium carbonate, silicic acid, etc.)

Various kinds of comparison tests may be used to assess that particular sand and stone materials (bodies C) are stronger than ordinary concrete sand and stone, e.g.

(1) measurement of hardness
(2) determination of the crushing strength of a single particle
(3) hardness of the minerals of which the sand and stone materials are composed
(4) determination of resistance to powder compression
(5) abrasion tests
(6) grinding tests
(7) measurement of strength on a composite material containing the particles.

Examples of bodies C with high strength and hardness are refractory grade bauxite containing 85% $Al_2O_3$ (corundum) and silicon carbide. Both materials have considerably higher hardness than the minerals in ordinary sand and stone. Thus, both corundum and silicon carbide are reported to have a hardness of 9 according to Moh's hardness scale, and the Knoop indentor hardness is reported to be 1635–1680 for aluminum oxide (corundum) and 2130–2140 for silicon carbide, while quartz, which is one of the hardest minerals in ordinary concrete sand and stone, has a Moh's hardness of 7 and a Knoop indentor hardness of 710–790 (George S. Brady and Henry R. Clauser, Materials Handbook, 11th ed., McGraw-Hill Book Company).

The high strength of these materials compared to ordinary concrete sand and stone has been demonstrated by powder compaction tests and by tests with mortar and concrete with silica-cement binder where the materials were used as sand and stone.

Many other materials than the two above-mentioned materials may, of course, be used as strong sand and stone materials (bodies C). Typically, materials with a Moh's hardness exceeding 7 may be used, e.g. topaz, lawsonite, diamond, corundum, phenacite, spinel, beryl, chrysoberyl, tourmoline, granite, andalusite, staurolite, zircone, boron carbide, tungsten carbide.

The hardness criterion could, of course, also be stated as Knoop indentor hardness where minerals having values above the value of quartz (710–790) must be considered strong materials compared with the minerals constituting ordinary concrete sand and stone.

Thus, the bodies C are typically bodies of materials containing strong natural minerals, strong artificial minerals, and strong metals and alloys, in particular of such materials that the strength of the particles corresponding to at least one of the following criteria:

(1) a die pressure of above 30 MPa at a degree of packing of 0.70, above 50 MPa at a degree of packing of 0.75, and above 90 MPa at a degree of packing of 0.80, preferably above 45 MPa at a degree of packing of 0.70, above 70 MPa at a degree of packing of 0.75, and above 120 MPa at a degree of packing of 0.80, as assessed (on particles of the material having a size ratio between the largest and the smallest particles substantially not exceeding (4) by the method described International patent application No. PCT/DK81/00048 Publication No. WO 81/03170 and European patent application No. 81103363.8,
(2) a compressive strength of a composite material with the particles embedded in a specified matrix exceeding 170 MPa (in case of a substantial amount of the particles being larger than 4 mm) and 200 MPa (in case of substantially all particles being smaller than 4 mm), preferably exceeding 200 MPa (in case of a substantial amount of the particles being larger than 4 mm) and 220 MPa (in case of substantially all particles being smaller than 4 mm), as assessed by the method described in International patent application No. PCT/DK81/00048, Publication No. WO 81/03170, European patent application No. 81103363.8 and Danish patent application No. 1957/81,
(3) a Moh's hardness (referring to the mineral constituting the particles) exceeding 7, preferably exceeding 8, (4) a Knoop indentor hardness (referring to the mineral constituting the particles) exceeding 800, preferably exceeding 1500.

The bodies C increase the strength of tools made of DSP materials in that, contrary to normal sand and stone used in connection with cement matrices, they have strengths which are of the same level as the DSP matrix proper, such as discussed in detail in International patent application No. PCT/DK81/00048, Publication No. WO 81/03170, and European patent application No. 81103363.8. The bodies C are typically present in a volume which is about 10–90% by volume, preferably 30–80% by volume, and in particular 50–70% by volume, of the total volume of the bodies A, B, and C. It is often preferred that the bodies C are also substantially densely packed.

The DSP matrix may further contain, embedded therein, property-improving bodies which are typically fibers and/or plates selected from the group consisting of metal fibers, including steel fibers, mineral fibers, glass fibers, asbestos fibers, high temperature fibers, carbon fibers and organic fibers, including plastics fibers, such as polypropylene fibers, polyethylene fibers, nylon fibers, Kevlar fibers and other aromatic fibers, whiskers, including inorganic non-metallic whiskers such as graphite and $Al_2O_3$ whiskers, wollastonite, asbestos, and other inorganic synthetic or naturally occurring inorganic fibers, metallic whiskers, such as iron whiskers, and mica. When the DSP matrix is established by ordinary intermixing and casting techniques, the fibers (or yarns or rovings) are normally chopped fibers (or yarns or rovings) and are typically present in an amount of 1–5% by volume when they have an aspect ratio of more than 100 or up to 5–10% by volume when they have an aspect ratio of 10 to 100. Larger amounts of chopped fibers may be incorporated in these techniques by combining large and small fibers, e.g. by use of an 0.1–1 mm thick steel fiber in combination with a 10 μm glass fiber.

It has often been found suitable to reinforce the DSP mass with chopped steel fibers, particularly steel fibers of a length of from about 5 mm to about 50 mm, in particular from about 10 to about 30 mm, e.g. steel fibers of about 10–15 mm, or steel fibers of about 20–30 mm, or mixtures thereof, the thickness being of about 0.2–1 mm, e.g. 0.3–0.6 mm. The steel fibers may also have a particular geometric configuration enhancing their fixation or anchoring in the material; for example, they may show indentations at their surfaces or may be shaped with hooks or other protrusions securing a maximum anchoring in the matrix.

Examples of additional bodies D which are advantageously incorporated in the articles of the invention are metal bars, including reinforcing steel bars or rods, which may be pre-stressed. When the materials comprise additional bodies D, it may be attractive for optimum strength and rigidity or for other purposes to obtain dense packing of the additional bodies. The easily deformable (easily flowable) matrix permits a considerably denser arrangement of additional bodies than was obtainable in the known art.

Especially the incorporation of fibers is of great interest due to the unique capability of the DSP matrix with respect to anchoring fibers. The particular type and configuration of fiber will depend upon the particular field of use of the moulded body, the general principle being that the larger the dimensions of the body, the longer and coarser are the preferred fibers.

Especially when the bodies of the invention are of large sizes, they are preferably reinforced with reinforcing steel such as bars or rods or steel wires or fibers. Due to the very gentle conditions under which the material can be shaped, the reinforcing bodies can retain their geometric identity during the casting process.

According to a particular embodiment, the DSP matrix (in particular adjacent to the active surface part of the shaping tool) comprises an additional solid substance in the voids of the structure formed from the particles A and B. This additional solid substance may, e.g., be selected from the group consisting of organic polymers such as polymethylmethacrylate or polystyrene, low-melting metals, and inorganic metalloid solids such as sulphur.

As described in the above-mentioned patent application, the DSP material may be cast by combining (A) inorganic solid particles of a size of from about 50 Å to about 0.5 μm, and (B) solid particles having a size of the order of 0.5–100 μm and being at least one order of magnitude larger than the respective particles stated under (A), a liquid, and a surface-active dispersing agent, the amount of particles B substantially corresponding to dense packing thereof in the composite material with homogeneously packed particles A in the voids between particles B, the amount of liquid substantially corresponding to the amount necessary to fill the voids between particles A and B, and the amount of dispersing agent being sufficient to impart to the composite material a fluid to plastic consistency in a low stress field of less than 5 kg/cm$^2$, preferably less then 100 g/cm$^2$, optionally bodies (C) as defined above, and optionally (D) additional bodies which have at least one dimension which is at least one order of magnitude larger than the particles A, by mechanically mixing the particles A, the liquid, and the surface active dispersing agent, optionally together with particles B, particles C and/or additional bodies D, until a viscous to plastic mass has been obtained, and thereafter, if necessary or if desired, combining the resulting mass with particles and/or bodies of the type mentioned above (B, C, D) by mechanical means to obtain the desired distribution of the components, and subsequently casting the resulting mass in a low stress field so as to obtain at least part of said shaped surface part, optionally with incorporation of particles C and/or additional bodies D during the casting.

The stress field responsible for the shaping of the mass will normally be a stress field mainly due to gravity forces acting on the mass, or forces of inertia acting on the mass, or contact forces, or the simultaneous acting of two or more of the above forces, In particular, the stress field will be due to oscillating forces with a frequency between 0.1 Hz and $10^6$ Hz, the oscillating forces being of the type stated above, or a combination of such oscillating forces with non-oscillating forces of the type stated above.

When the bodies A are silica dust and the bodies B are Portland cement, the liquid is water, and the dispersing agent is typically a concrete superplasticizer of the kind discussed in International patent application No.

PCT/DK79/00047, Publication No. WO 80/00959, or International patent application No. PCT/DK81/00048, Publication No. WO 81/03170, and European patent application No. 81103363.8.

Figure 2:
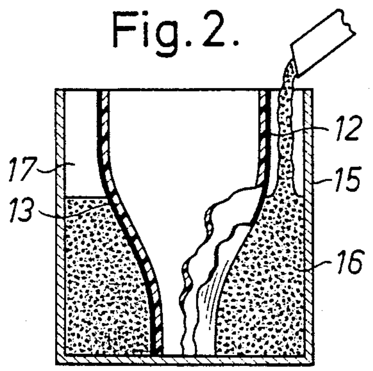

The surface-active dispersing agent is normally present in an amount sufficient to allow a fluid to plastic consistency of the material in a low stress field of less than 5 $kg/cm^2$, preferably less than 100 $g/cm^2$, and the ideal amount of the dispersing agent is one which substantially corresponds to the amount which will fully occupy the surface of the particles A of FIG. 2 in International patent application No. PCT/DK79/00047.

Any type of dispersing agent, in particular concrete superplasticiser, which in sufficient amount will disperse the system in a low stress field, is useful for the purpose of the invention. The concrete superplasticiser type which has been used in the examples is of the type comprising alkali or alkaline earth metal salts, in particular a sodium or calcium salt, of a highly condensed naphthalene sulphonic acid/formaldehyde condensate, of which typically more than 70% by weight consist of molecules containing 7 or more naphthalene nuclei. A commercial product of this type is called "Mighty" and is manufactured by Kao Soap Company, Ltd., Tokyo, Japan. In the Portland cementbased silica dust-containing DSP materials used according to the invention, this type of concrete superplasticiser is used in the high amount of 1–4% by weight, in particular 2–4% by weight, calculated on the total weight of the Portland cement and the silica dust.

Other types of concrete superplasticisers useful for the purpose of the present invention appear from Example 2 of International patent application No. PCT/DK81/00048, Publication No. WO 81/03170, and European patent application No. 81103363.8. These are: Mighty, Lomar-D, Melment, Betokem and Sikament.

The DSP material may be packed and shipped as a dry powder, the addition of the liquid, typically water, taking place on the job. In this case, the dispersing agent is present in dry state in the composite material. This type of composite material offers the advantage that it can be accurately weighed out and mixed by the producer, the end user just adding the prescribed amount of liquid and performing the remaining mixing in accordance with the prescription, e.g., in the manner described in Example 11 in International patent application No. PCT/DK79/00047 and in International patent application No. PCT/DK81/00048, Publication No. WO 81/03170, and European Patent application No. 81103363.8.

The weight ratio between water and Portland cement plus any other bodies B plus silica dust in cement-silica-dust-based DSP materials is typically between 0.12 and 0.30, preferably 0.12–0.20. The abovementioned patent applications also disclose several important variations and embodiments for making valuable DSP materials, including embodiments where the composite material is pre-mixed or shaped in a higher stress field, in which case the water/powder ratio may be as low as, e.g., 0.08–0.13. Thus, e.g., the casting may also be performed by extrusion or rolling at a shaping pressure of up to 100 $kg/cm^2$, and in special cases at even higher shaping pressures.

The casting may also be performed by spraying, painting or brushing, injection or application of a layer of the mass on a supporting surface and shaping the mass so as to obtain at least part of said shaped surface part.

The casting may also be performed as centrifugal casting.

When the DSP matrix contains an additional solid substance in voids of the structure formed from the particles A and B, this solid may be introduced by partially or completely infiltrating the solidified DSP material with a liquid and thereafter solidifying the liquid, such as by cooling or polymerisation, to form the solidified substance. The liquid will usually show at least one of the following characteristics:

- it is capable of wetting the internal surface of the structure formed from the particles A and B,
- it contains molecules of a size which is at least one order of magnitude smaller than the particles A,
- on solidification by cooling or polymerisation, it leaves a solid substance of substantially the same volume as the liquid.

The efficiency of the infiltration with the liquid may be enhanced by one or more of the following measures:

- drying the article or the part thereof to be impregnated,
- applying vaccum on the article or the part thereof to be infiltrated prior to the infiltration treatment,
- applying external pressure to the infiltrating liquid after contacting the article with the infiltrating liquid.

DSP material in its solidified state has a strength and stiffness which may be compared to the strength and stiffness of cast iron. However, DSP material is superior to cast iron in many other respects. Thus, unsolidified DSP material may be poured or cast at room temperature, and the volume changes occurring by solidification or curing are substantially smaller than those occurring by solidification of metals. Furthermore, the structure of DSP material may be modified in many respects, for example by the above-mentioned incorporation of fibers or other reinforcing means, such as prestressed steel reinforcements, therein. The excellent mouldability of DSP material permits precision moulding of bodies with sizes and shapes which cannot be obtained by metal casting, and bodies moulded from DSP material do not require any finishing treatment.

Other materials which are valuable concrete-like materials for the tools of the present invention or especially for the surfaces thereof, which subject to excessive stress conditions are certain cement-polymer based materials (CP materials and DSPP materials):

UK patent application No. 7905965, publication No. 2 018 737 A, European patent application No. 80301908, publication No. 0 021 681, and European patent application No. 80301909, publication No. 0 021 682 A1, disclose the production of specimens of a substantially higher quality than usual cement-based products based on the use of far more concentrated polymer solutions than those conventionally combined with Portland cement in very high concentrations and based on very intensive mixing of the components, typically in a high stress field. Such materials are valuable materials for use as concrete-like materials according to the present invention. A particularly valuable embodiment of such materials is one in which they are combined with fibers of the above-mentioned types, and/or one in which their viscosity has been lowered to a suitable value for casting or molding by a pre-treatment such as dilution with polymer solution or water prior to casting, in particular during high stress field mixing. Especially interesting polymer-containing materials are DSP materials which correspond to the above-described DSP materials, but in which a polymer binder is also present (such materials can be designated DSPP materials: Densified Systems containing Polymer and homogeneously arranged ultrafine Particles).

The organic polymers contemplated for use in CP or DSPP materials comprise, e.g., the same polymers as those mentioned in the above-mentioned UK patent application No. 7905965, Publication No. 2 018 737 A, that is, water-dispersible polymers more or less pertaining to the following groups (or mixtures of polymers pertaining to one or several of the groups):

I. Latexes (colloidal aqueous emulsions of elastomers) as defined in (1) Kirk-Othmer, Encyclopedia of Chemical Technology, 7, pages 676/716).

II. Water soluble resins as defined in reference (1), 17, pages 391–410 or as defined in 3) Yale L. Meltzer: "Water-Soluble Polymers. Developments since 1978", Chemical Technology Review No. 181, Noyes Data Corporation, Park Ridge, New Jersey, USA 1981, pages 1–596, or resin derivatives as defined in 2) P. Ullmann, 12, pages 530–536.

According to a particular aspect, the polymer may belong to a special group:

III. Cement dispersing agents known as concrete superplasticizers, e.g., medium molecular weight polymers such as alkali or alkaline earth metal salts of sulphonated naphthalene or melamine formaldehyde condensates or their parent acids or higher molecular weight polymers thereof. Also amide derivatives of these polymers may be used.

It is a characteristic feature of all of the above-mentioned polymer classes that the polymers thereof are capable of forming film from an aqueous dispersing through dewatering and/or cross-linking.

Typical concentrations of polymer in the aqueous phase used for making the cement-polymer-containing matrices are in the range of 1–60%. The amount of aqueous phase (water+polymer) used in preparing the materials is in the range of from about 10 to about 70% by volume, in particular in the range of from about 20 to about 50% by volume, calculated on the total composition.

The ratio between polymer (solid) and cement will depend upon several factors such as the desired strength of the material, the exact character of the polymer, the type and particle size of the cement, the presence of any other bodies which fill voids between the cement particles, etc. However, the volume ratio between polymer and cement in the matrix used in the materials according to the invention will normally be in the range between 0.1 and 35 per cent by volume (but may be between 0 and 40% by volume), and will in many cases be between 2 and 10 per cent by volume.

In special cases, special precautions are taken to obtain a particularly efficient distribution of the components of the matrix by means of high shear treatment, extended period of milling or grinding, pressure molding or shaping of the articles from the matrix-containing material, usually combined with keeping the shaped articles at super-atmospheric pressure for a period after the shaping process, all of which measures tend to result in a material having a small ratio of pores to matrix and a pore distribution with specified maximum percentages of pores of specified maximum sizes such as described in European patent application No. 80301909, Publication No. 0 021 682 A1. Another measure which is taken to impart to the matrices the special characters involving for example tensile strength in bending is the use of particular gap grading systems such as disclosed in European patent application No. 80301908, Publication No. 0 021 681 A1.

A very special type of matrix of high strength and especially also high tensile strength in bending suitable for the present invention although it will often not contain any polymer is a matrix comprising, as its substantial binder component, cement, the materials forming the matrix having been subjected to a particular treatment, that is, intense grinding and shear influence during early stages of the hydration of the cement, resulting in the formation of extremely well-distributed colloid of cement hydration products in a very homogeneous material. Such material may be produced by high shear treatment and grinding of cement with added water until some hydration of the cement has taken place.

The cement used in the matrices of the present invention is normally Portland cement, including any modifications of Portland cement such as low heat cement, low alkali sulphate resistant cement, gypsum, plaster of Paris, calcium sulphate, high alumina cement, magnesium oxide cement, zinc oxide cement, and, for various special purposes cements of the silicon oxide cement type (as specified in e.g. U.S. Pat. No. 4,154,717, of May 15, 1979) and fluoroaluminosilicate glass and other types used in dental technology, e.g. glass ionomer cement types and other cements of types which may deliver ions capable of cross-linking the polymer.

On the whole, it is interesting to note that part of the curing mechanism in these matrices used according to the present invention may be said to consist in ionic "cross-linking" of negative sites on polymers through di-, tri- or other polyvalent positive ions (cations) such as calcium ions or silicon ions, cf., e.g., L. Holiday, Chemistry and Industry, 2nd December, 1972, pages 921–929.

In connection with the ionic "cross-linking" of polymers, one particularly interesting group of polymers is polymers based on acrylic acids and other polymers having carboxylic acid groups or derivatives thereof linked to a polymer backbone. Examples of such materials are listed on page 115–145 in "New Dental Materials" edited by Paul G. Stecher, Noyes Data Corporation, Park Ridge, New Jersey, USA, 1980. Most of these polymers are classified in the above-mentioned group II, that is, as water-soluble resins. Particularly interesting materials of this type comprise materials in which the carboxy group has been modified into an amide group. In a basic environment, the amide group will be split off due to alkaline hydrolysis and the carboxy group will be available for cross-linking with cations, notably ions released from the inorganic parts of the matrix material. Polymers which are acids and which cross-link in the presence of bases are known in dental technology. For the purpose of the present application, such polymers will normally be too reactive in than they react too fast to allow shaping or molding of the composition after mixing. However, by suitable use of the inorganic component of the matrix, it may be possible to utilize such polymers carrying acidic groups, e.g. by using an inorganic material which very slowly releases cations so that the reaction will be limited by the limited availability of the cations. Such materials may be plaster of Paris or fluoroaluminosilicate glasses. In this connection, it should be mentioned that Portland cement leaches ions of several types, including calcium ions (predominantly), aluminum ions, silicon ions, manganese ions, magnesium ions, and iron ions.

CP or DSPP materials may be used according to the invention in the same manner as DSP materials, or the CP or DSPP materials may be applied as, e.g., strips or sheets on areas which will be exposed to maximum stresses.

Whenever reference is made to DSP materials in the following, it should be understood as also referring to CP or DSPP materials adapted to suit the same purposes.

The present invention makes it possible to substantially extend the field of application of objects or bodies made from DSP material, including DSPP material, and other concrete materials or non-concrete materials which are mouldable at low temperatures, in particular CP materials.

Thus, the present invention relates to a method which comprises applying layer of metal to a body surface part. This permits the production of bodies or objects from basic materials which are easy to mould and may be chosen so as to have desired strength characteristics, and to which desired surface characteristics corresponding to those of metals are imparted to the total surface or to selected surface parts. For instance, such selected surface parts may be provided with a layer of cemented carbide in order to obtain hardness and superior wear resistance qualities, or with bearing metals in order to obtain surface parts which may function as bearing surfaces. Alternatively, the metal layer may serve to impart electrically conductive or electrically insulating properties to the surface parts or to provide resistance to chemical influence.

In the present specification and claims, the term "metal" is intended to comprise also metal alloys, intermetallic compounds, and refractory compounds.

The layer of metal may be a prefabricated metal member, and the body surface part may then be moulded against and bound to the prefabricated metal member. In order to obtain the necessary adherence or bond between the prefabricated metal member and the body being moulded, the metal member may, for example, be provided with a roughened inner surface part, or with projecting anchoring means which become embedded in the basic material when the body is being moulded. The prefabricated metal member may be made by any known method, for example by sintering metal powder, or by casting. If the metal member is made by a sintering process, it does not normally need any finishing treatment. If, however, the metal member is made by casting, the exposed surface or surfaces of the metal member may be machined or subjected to any other suitable finishing treatment.

In an alternative embodiment of the method according to the invention, the layer of metal is applied to the body surface part after moulding the body. The metal layer may then be applied by any suitable process, but in the preferred embodiment the metal is applied to the surface part as discrete particles or microunits, for example by plasma plating, electroplating, or vapor deposition. Alternatively, the metal layer may be applied to the surface part as a metal foil which is fastened to the said body by means of a suitable adhesive or other binding means.

In a preferred embodiment of the invention the metal layer is applied to the body surface part by a special technique. Thus, the method according to the invention may further comprise providing a mould member with a mould surface part which is complementary to the body surface part, applying the metal layer to the mould surface part, moulding the basic material against the metal layer on the mould surface part so as to form the body, and removing the mould member from the metal layer. The mould member may be made from any suitable material, such as plastics, wax, ceramics, or glass. Preferably, the mould surface part on the mould member is provided with a very smooth surface, so that the outer surface of the metal layer on the body produced becomes very smooth, too, and such a smooth surface may be obtained even if the metal layer applied is very thin. The mould surface part may for example, be a plane or curved surface of a glass pate, which may be removed after moulding and solidification of the basic material. In this manner, one or more surface parts of a body made from a basic material, such as concrete or DSP-material, may be provided with a very thin metal layer having a smooth surface. This may, for example, be used for providing such bodies with a decorative and/or corrosion protective layer or foil of a suitable metal, such as gold, silver, aluminum, or any other desired metal.

The mould surface part may have such a shape that it cannot be removed as a whole after moulding and solidification of the basic material. In that case the mould member is preferably made from a decomposable or disintegratable material, which should be interpreted to include materials which may be dissolved in solvents, and/or chemically decomposed with resulting transition to fluid or disintegrated form, and/or melted or decomposed by heating, and/or crushed when subjected to suitable mechanical forces. For instance, the mould member may be made from a plastics material which may be dissolved by means of a solvent such as chloroform, or melted or decomposed by heating. Alternatively, the mould member may be made from wax, or from a metal with a substantially lower melting point than that of the metal in the metal layer, so that the mould member can be removed after melting.

It is important to secure a suitable bond between the metal layer and the body surface part to which it is applied. In some cases suitable interlocking between the metal layer and the body to which it is applied may be obtained by means of the shape of the body surface part which is coated by the metal layer, for example when this surface part defines a surface of revolution with a curved generatrix. In other cases, the desired bond between the metal layer and the adjacent basic material may be obtained by anchoring means, such as staple fibers, wire mesh, or other fibrous material, thread material, and or wire material, which may be embedded in the basic material and in the metal layer at the interface therebetween. The anchoring means may, for example, be applied to the mould surface part of the mould member together with the metal forming the metal layer, for example by plasma plating. Alternatively, the anchoring means may be positioned on the mould surface part prior to applying the metal layer thereto. In the latter case, the anchoring means which may include fibers, may be retained in position in relation to the mould surface part by magnetic or electrical forces. In a more preferred embodiment, the fibers or anchoring means are embedded in a layer or tape including an evaporatable basic material, and this tape or layer may then be applied to the mould surface part before the metal is applied thereto. The basic material of the tape may then be of such a kind that it will evaporate and disappear when the metal layer is sprayed onto the tape, so that only the reinforcing means will remain embedded in the metal layer applied to the mould surface part and extending outwardly from this metal layer.

The mould member may be constituted by a layer of a decomposable or disintegratable material which is formed on a backing surface part of a base member. When a metal layer has been applied to the outer surface of this layer of decomposable or disintegratable material, and the body has been moulded against the metal layer, the disintegratable or decomposable material may be removed. In this way it is possible to produce a device with complementary surface parts spaced by the thickness of the layer of decomposable or disintegratable material, which complementary surface parts are defined on a body made from the basic material, such s concrete or DSP material, and on the base member which may be made from any desired material, such as metal, respectively. The method described is especially suited for the production of bearings, pivots, joints, articulations, and similar devices comprising interengaging male and female members having a space therebetween determined by the thickness of the layer of decomposable or disintegratable material. The method also permits the production of ball-and-socket joints and similar devices provided with male and female members with cooperating complementary surface parts which are shaped so as to prevent separation of said male and female members.

The method according to the invention also permits forming the body and the base member from the basic material simultaneously. Thus, the mould member may be made from a plastically deformable sheet or plate material forming a partition between interconnected mould chambers, and the body and the base member may then be moulded simultaneously in each of the chambers. A method of this type is described in Applicant's prior Danish application No. 1961/81 filed on 1st May, 1981, the contents of which is incorporated herein by reference. However, according to the present invention, a metal layer is applied to one or more surface parts of the deformable sheet or membrane separating the mould chambers.

According to another aspect, the present invention provides a method of producing a body from a mouldable basic material, and from a surface defining material which forms an outer layer of the body and defines a desired surface part thereof. This method comprises providing a mould member with a mould surface part which is complementary to said desired surface part, applying a layer of said surface defining material to said mould surface part, moulding said basic material against said layer on said mould surface part so as to form said body, and removing said mould member from said layer of surface defining material. In this aspect of the invention, the surface defining material need not necessarily be metal, but may be any other suitable material, such as plastics, and the basic material from which the body is moulded need not necessarily be one which is mouldable at low temperatures. This aspect of the invention may especially be advantageous in cases where it is desired to produce a body with an inner concavely curved surface part coated with some kind of surface defining material which is different from the basic material.

The application of the surface defining material to the mould member, and the later removal of this mould member may be obtained by using techniques similar to those described above.

According to a further aspect, the present invention provides a method of making male and female bodies which are interlocked by their shapes. This method comprises forming one of said bodies, applying a layer of a decomposable or disintegratable material to a surface part thereof, moulding the other body against said layer so as to provide a surface part complementary to said first surface part, which surface parts have shapes causing the bodies to interlock, and decomposing or disintegrating the material of said layer so as to remove it from the space defined between said surface parts of the male and female bodies. By this method it is possible to produce devices with cooperating male and female members which have cooperating, complementary surface parts defining a desired space therebetween, and which are shaped so as to prevent separation of these members.

The method according to the invention may, e.g., be used for making machine parts, such as bearings, gears, and the like, from DSP material, and the surface parts which are especially exposed to wear or adapted to cooperate with other surfaces, such as bearing surfaces and tooth flanks, my be coated with a suitable material, such as metal. The metal according to the invention may also be used for making plane or curved structural elements moulded from DSP material the outer surfaces of which are coated with a layer of metal or another material, in order to obtain a decorative effect, and/or to reduce gas permeability and/or to obtain radiation reflection properties. As an example, heat insulating containers for containing liquified gases, with a double wall defining a vacuum space, may be moulded from DSP material and provided with a metal coating in order to reduce the gas permeability of the walls. Similarly, a shell structure of the type defined in Applicant's co-pending Danish patent application No. 1950/81 filed on 1st May, 1981, may be moulded from DSP material and the walls of the structure may then be made impermeable to gas by applying a metal layer to the outer surfaces of the structure. DSP material may advantageously be used for making moulds for die casting of plastics and metals, and moulds or tools for pressing, shaping and/or punching sheet metal, and the like. For such applications, it may be desirable to provide the inner surfaces or selected surfaces of the moulds or tools with a coating in accordance with the method of the invention in order to obtain smoothness, wearability, and/or other desired surface characteristics.

Figure 3:
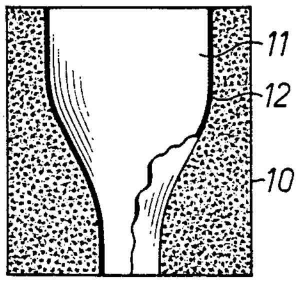
Figure 4:
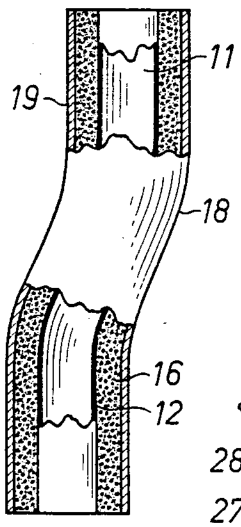
Figure 5:
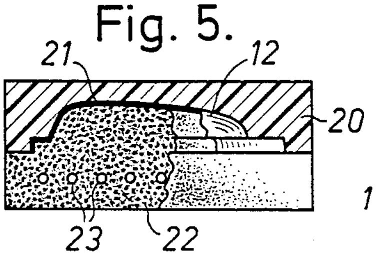
Figure 6:
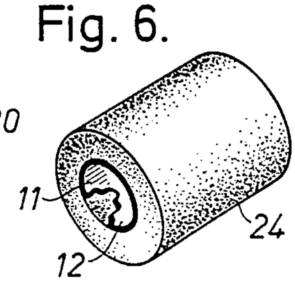
Figure 7:
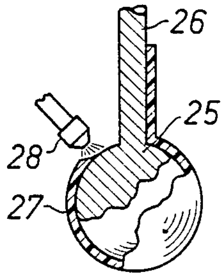
Figure 8:
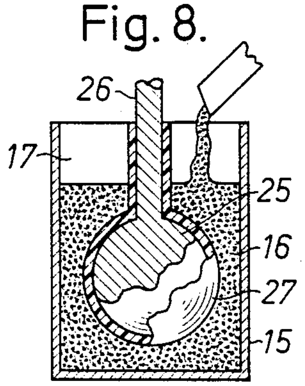
Figure 9:
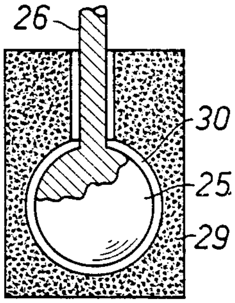
Figure 13:
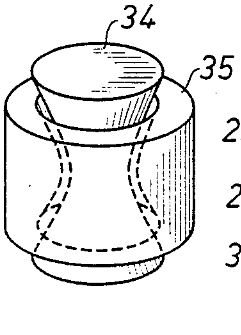
Figure 10:
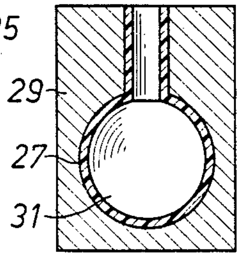
Figure 11:
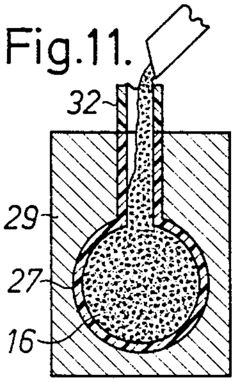
Figure 12:
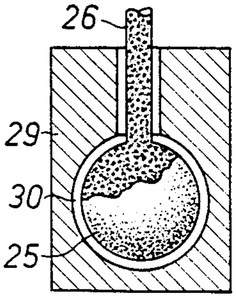
Figure 20:
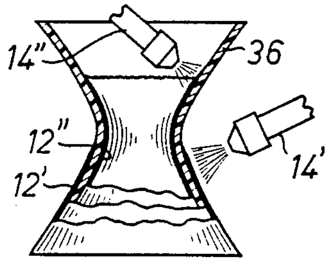
Figure 21:
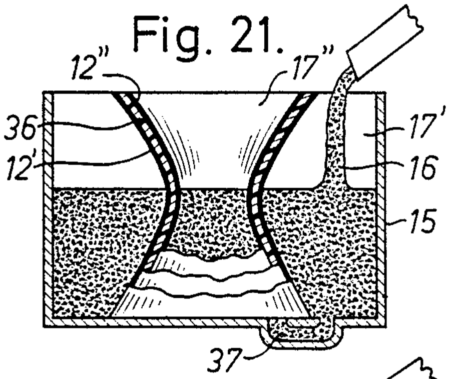
Figure 22:
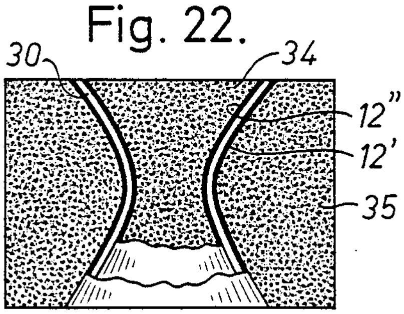
Figure 23:
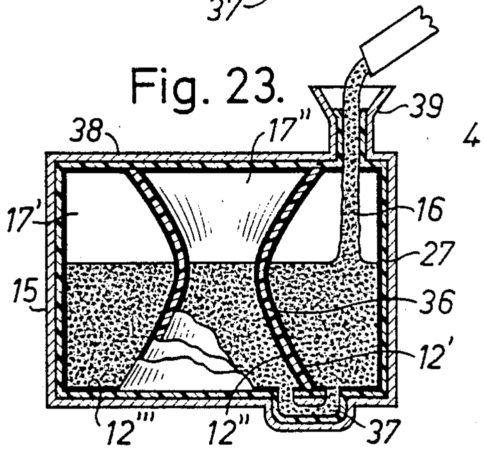
Figure 24:
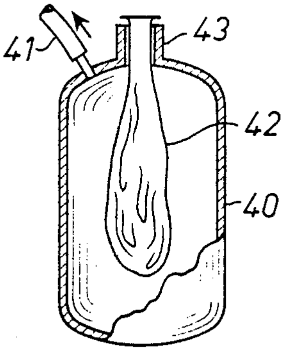
Figure 25:
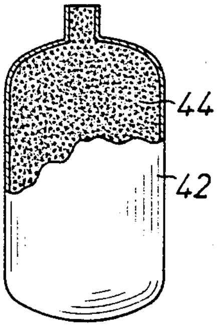
Figure 26:
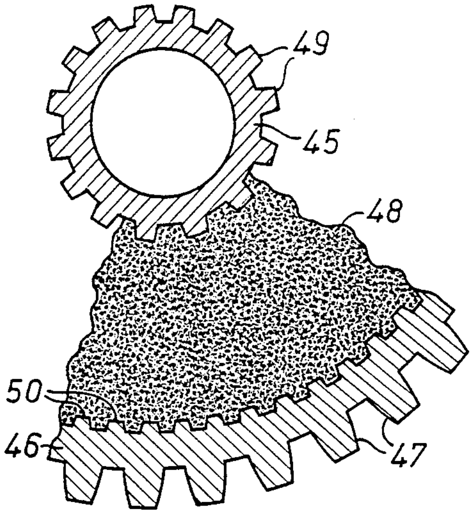
Figure 27:
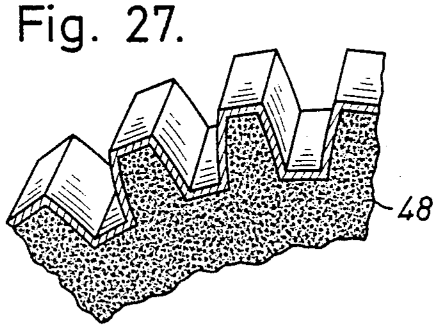
Figure 28:
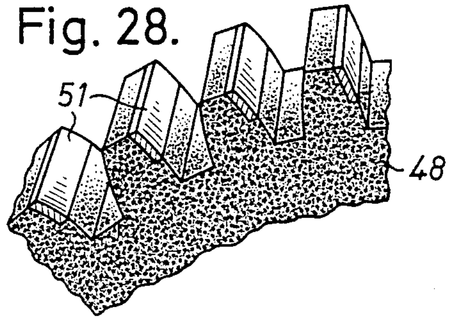
Figure 29:
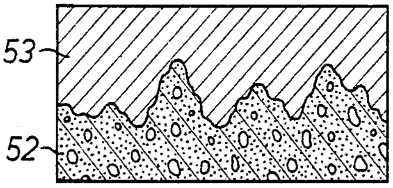
Figure 31:
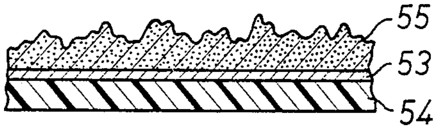
Figure 30:
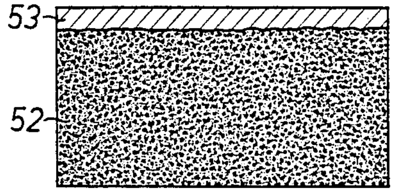
Figure 32:
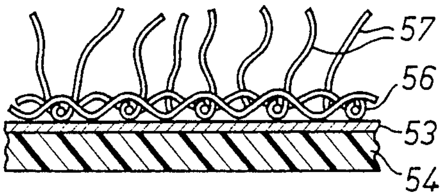
Figure 33:
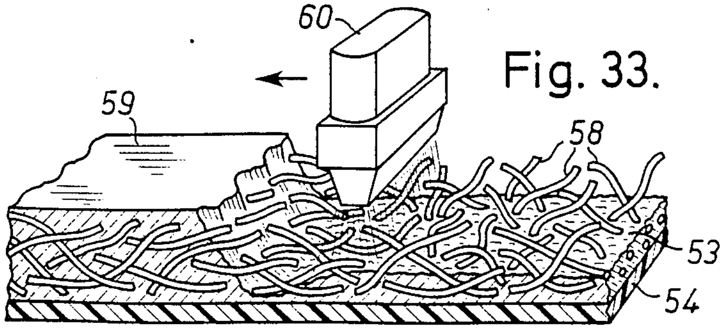
Figure 34:
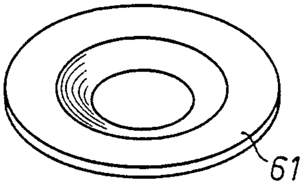

The invention will now be further described with reference to the drawings, wherein FIGS. 1–3 illustrate a method of moulding a machine element with a metal coated surface defining a throughgoing passage, FIG. 4 shows a tubular member which may be made by the method according to the invention, FIG. 5 illustrates a method of making the male member of a pressing tool, FIG. 6 is a bearing sleeve which may be made by the method according to the invention, FIGS. 7–9 illustrate a method of moulding a joint of the ball-and-socket type, wherein the socket member is moulded around a prefabricated ball member, FIGS. 10–12 illustrate a moulding method similar to that of FIGS. 7–9, but where the ball member is moulded after forming the socket member, FIGS. 13 illustrates another device with separated, interengaging members, which may be made by the method according to the invention, FIGS. 14–19 illustrate methods of making a joint of the ball-socket-type, wherein at least one of the cooperating surfaces of the ball and socket members, respectively, are coated with a surface defining material, FIGS. 20–22 illustrate moulding a device with male and female members with cooperating complementary coated surfaces parts, wherein a deformable membrane is used for defining said surface parts, FIG. 23 illustrates a method corresponding to that of FIGS. 20–22, wherein all surface parts of the device are coated, FIGS. 24 and 25 illustrate a method, wherein a coating or surface layer, which is originally in the form of an expandable or inflatable bladder or bag, is used, FIG. 26 shows a fragment of a gear formed by moulding a basic material in a space defined between a metal hub and a toothed rim part of metal, FIG. 27 is a fragment of a similar gear, wherein the toothed rim has a different shape, FIG. 28 is a fragment of a gear, wherein metal members are applied to the tooth faces only, FIG. 29 diagrammatically illustrates a section in a body surface part, where the coating is applied to the surface of a prefabricated body moulded from a basic material, FIG. 30 is a section as the one shown in FIG. 29, but where the coating has been applied to a surface part of a mould member, whereupon the basic material has been moulded against said coating while positioned on the mould member, FIG. 31 is a fragmentary sectional view showing a mould member provided with a surface defining layer or coating and with a layer of bond-increasing substance, FIG. 32 is a section similar to that shown in FIG. 31, wherein the layer of bond-increasing coating has been replaced by a wire mesh, FIG. 33 illustrates a method of embedding anchoring means in a coating being applied to a mould member, FIG. 34 is a perspective view showing a plate- or dish-shaped model, and FIGS. 35–39 illustrate a method of making cooperating male and female press tools for making dish-shaped metal members from sheet metal by a drawing process.

FIG. 3 diagrammatically shows an extruder part 10 made from DSP material. This extruder part defines a throughgoing passage 11 with a gradually decreasing cross-sectional area; the inner wall of the passage is coated with a metal layer 10. The extruder part 12 may, for example, be used for connecting an extruder die with an extruder chamber. As illustrated in FIGS. 1 and 2, the extruder part 10 may be made by applying the metal layer 12 to the outer surface of a hollow mould member or core member 13 having an outer surface which is complementary to the desired shape of the inner wall of the throughgoing passage 11. The mold or core member 13 may, for example, be made from plastics or another suitable material. The metal layer 12 may, for example, be applied to the outer surface of the mould member 13 by plasma plating by means of a spraying device 14. Alternatively, the metal layer may be applied by electroplating, vapour depositing, or by any other suitable metal applying technique.

When the mould or core member 13 has been provided with the metal layer 12 it is positioned in a container or mould 15 having an inner surface with a shape corresponding to the desired outer shape of the extruder part 10. A liquid or paste-like basic material 16, which may cure or solidify at low temperatures, such as DSP material or another concrete material, may now be poured into a mould cavity 17 defined between the inner wall of the mould 15 and the metal layer 12 on the core member 13. While the basic material 16 is poured into the mould cavity 17, the mould 15 may be vibrated, or any other pouring technique well known in connection with pouring of concrete may be used.

When the basic material 16 has solidified, the mould 15 and the core member 13 are removed, leaving the metal layer 12 s a coating on the inner wall of the extruder part 10 defining the passage 11. The core member and/or the mould 15 may be retracted from the extruder part 10 as a whole. However, alternatively, the core member 13 and/or the mould 15 may be made from a decomposable or disintegratable material so that one or both of these parts may be removed, for example by means of a solvent, by melting, or by crushing, without damaging the extruder part 10 or the metal layer 12. As an example, the core member 13 may be made from plastics material and may then be removed by melting or by dissolution in chloroform.

It should be understood that by using a core member 13 with a smooth outer surface it is possible to obtain a very smooth inner surface of the passage 11 which may be provided with a very thin coating of a suitable metal. It should also be understood that it would not be possible to apply the metal layer 12 uniformly and directly to the inner surface of the extruder part 10 by a metal sputtering technique. It is far easier to apply the metal layer to the outer surface of the core member 13.

FIG. 4 shows a tubular member 18 mainly consisting of a moulded basic material 16 and having a throughgoing passage 11 defined by an inner wall which has been coated with a metal layer 12. The tubular member also comprises an outer casing 19. This tubular member 18 may be made by a moulding method similar to the one described in connection with FIGS. 1–3, and in such a method the casing 19 may replace the container or mould 15 shown in FIG. 2.

As described in detail in Applicant's above-mentioned patent applications and in Applicant's Danish patent application No. 4940/80 filed on 19th Nov., 1980, and the corresponding International patent application No. PCT/DK81/00103, the contents of which are hereby incorporated by reference, DSP material may advantageously be used for making male and female tool parts for use in pressing, drawing and stamping sheet metal. The quality of such pressing tool is to a high extent depending on the smoothness and other surface characteristics of the active surface parts of such tools. It has been found that such pressing tools made from DSP material may be substantially improved by applying a layer of metal to the active surface parts of the tool. The metal layer may be applied to these surface parts after the tools have been moulded. However, more perfect metal coated surfaces may be obtained when the tool is made by a method similar to that described in connection with FIGS. 1–3. FIG. 5 shows a mould member 20 with a smooth surface part 21 which is complementary to the desired shape of the active surface part of a male tool part 22 to be produced. A metal layer 12 is applied to the mould surface part 21, and the basic material or DSP-material is then poured into a mould cavity partly defined by the metal layer 12. When the basic material which may have steel reinforcements 23 embedded therein, has solidified, the mould member 20 and the other parts defining the mould cavity are removed by a method leaving the metal layer 12 on the active surface part of the tool 22.

The mould member 20 shown in FIG. 5 may, e.g., be made by casting the surface part 21 against a complementary surface which has been made by casting against an original shape which is to be reproduced. A pressing tool for pressing a car body part from sheet metal may, e.g., be made by moulding DSP material against a surface of such car body part. If it is desired not to coat the total active surface of the pressing tool, but only part thereof exposed to excessive wear during use, such coated part or parts may be produced as illustrated in FIG. 5., and after solidification, they may be placed at their respective positions in engagement with the car body part, and thereafter, these metal coated elements may be united by moulding DSP material against the total surface of the car body part.

FIG. 6 shows a cylindrical tubular member or sleeve 24 having a throughgoing inner passage 11 defined by an inner surface which is coated by a metal layer 12. This sleeve may be made by a method similar to the one described in connection with FIGS. 1–3. When the metal in the layer 12 is a suitable bearing metal, the sleeve 24 may, for example, be used as a bearing sleeve.

FIGS. 7–9 illustrates a method for producing a joint device or articulation of the ball-and-socket type. FIG. 7 shows a prefabricated ball member 25 with a neck 26. This ball member may, for example, be made from metal or DSP-material as desired. A layer 27 of a decomposable or disintegrateable material, such as plastics or wax, is thereafter applied to the outer surface of the ball member 25, for example by means of a spraying nozzle 28. The ball member 25 coated with the layer 27 is then placed in a container or mould 15, and a liquid or paste-like basic material, such as DSP material, is poured into the mould cavity 17 defined between the outer surface of the layer 27 and the inner surface of the mould 15. Upon solidification of the basic material, it will form a socket member 29. The layer 27 may now be decomposed or disintegrated and removed so as to form a space 30 between the ball and socket members 25 and 29. It is understood that the thickness of the layer 27 being applied to the ball member 25 will determine the width of the space 30.

FIGS. 10–12 illustrate a similar method in which the socket member 29 is prefabricated, for example from metal or DSP material, and a layer 27 of a decomposable or disintegrateable material, such as plastics or wax, is then applied to the inner surface of the socket member. The basic material 15 may now be poured directly into the inner space 31 defined by the layer 27, for example through a funnel or tube section 32. Upon solidification, the basic material will form the ball member 25 with the neck 26, and when the layer 27 has been removed so as to provide a space 30 between the ball and socket members 25 and 29, a device (FIG. 12) similar to that shown in FIG. 9 has been obtained.

Figure 14:
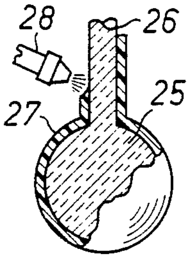
Figure 15:
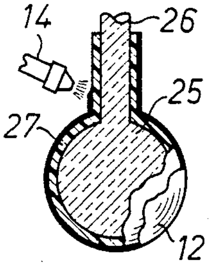
Figure 16:
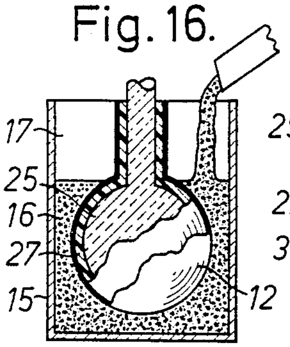

FIGS. 14–16 illustrate a method corresponding to the method described in connection with FIGS. 7–9, and corresponding parts are referred to by the same similar reference numerals. The method of FIGS. 14–16 deviates from that illustrated in FIGS. 7–9 only in that a layer 12 of metal or another desired coating material is applied to the outer surface of the layer 27 of the disintegratable material by means of a spraying device 14 as shown in FIG. 15. The coated ball member 15 is then arranged in the mould 15 s shown in FIG. 16, and the basic material 16 is poured into the mould cavity 17. When the layer 27 of decomposable material has been removed, the coating or metal layer 12 will remain on the inner wall of the cavity formed in the socket member 29.

Figure 17:
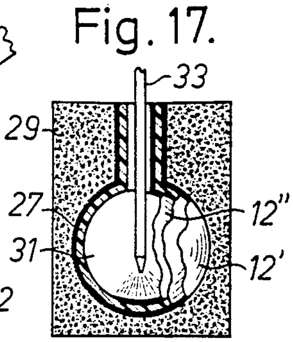
Figure 18:
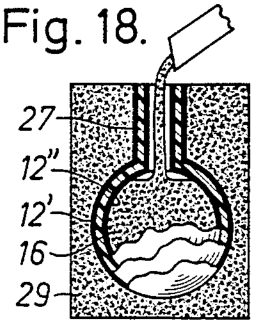
Figure 19:
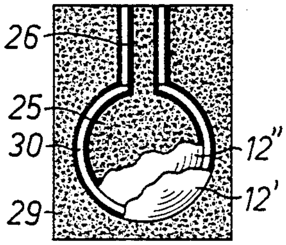

FIGS. 17–19 illustrate a method similar to the method illustrated in FIGS. 10–12. In the method of FIGS. 17–19, the socket member 29 is made from DSP-material, and a metal layer or coating 12' is applied to the inner surface of the inner space 31 by means of electrode device 33 before the layer 27 of the decomposable material is applied to the inner surface of the space 31. Alternatively, the metal layer 12' may be applied by using a method corresponding to the one explained in connection with FIGS. 1–3. A second layer or coating 12'' of metal is applied to the surface defined by the layer 27 as shown in FIG. 17. Then, the basic material 16, such as DSP material, is poured into the space 31, and after solidification, it forms the ball member 25. When the layer 27 has been removed, a space 30 is provided between the socket member 29 and the ball member 25 as shown in FIG. 19, and the metal coatings or layers 12' and 12'' will remain on complementary surfaces of the socket member 29 and the ball member 25, respectively.

FIGS. 20–22 illustrate a method of forming an hourglass-shaped male member 34 arranged within a similarly shaped passage defined in a female member 35. A flexible membrane or wall 36, which is made from a decomposable or disintegratable material, such as plastics, rubber, or elastic fabric coated with wax, or the like, has been given a shape corresponding to the desired shape of the male member 34 as shown in FIG. 20. Metal layers or coatings 12' and 12'' are applied to the outer and inner surfaces, respectively, of the membranes 36 by means of spraying devices 14' and 14''. The coated membrane 36 is arranged in a container or mould 15 as shown in FIG. 21 so as to divide the inner space of the mould 15 into separate mould cavities 17' and 17'', respectively. These mould cavities are interconnected by means of a connecting passage 37. Therefore, when basic material 16, such as DSP material, concrete, or another suitable material, is poured into one of the cavities as shown in FIG. 21, substantially the same level of the basic material will be obtained in the cavities 17' and 17'', so that no hydraulic pressure difference which might deform the membrane 36 will occur. Upon solidification of the basic material 16, the membrane 36 is disintegrated and removed, for example by means of a suitable solvent or by melting, whereby the metal coatings or layers 12' and 12'' are left on the complementary surfaces of the female member 35 and the male member 34, respectively, and a space 30 is defined therebetween as shown in FIG. 22. A perspective view of the finished product is shown in FIG. 13.

FIG. 23 illustrates a modified embodiment of the method illustrated in FIGS. 20–22. In FIG. 23, the mould 15 is provided with a top wall 38 having a pouring funnel 39 thereon, and the inner wall of the mould 15 is provided with a layer 27 of a decomposable or disintegratable material and a superimposed layer or coating 12''' of metal. Thus, the finished product will be provided with metal coatings not only on the complementary surface parts of the male and female bodies 34 and 35, but also on all outer surface parts, so that the finished product will obtain the appearance of a device made from solid metal.

FIGS. 24 and 25 show a bottle-like container or mould which is provided with a conduit 41 which may be connected to a vacuum source, not shown. A bag-shaped membrane 42 of an elastic material is arranged in the mould 40, so that the opening of the bag-shaped membrane is retained in the neck 43 of the container. When the conduit 41 has been connected to a vacuum source, the membrane 42 will become stretched and come into close engagement with the inner surface of the container 40. A suitable basic material may then be poured into the mould. Upon solidification of the basic material the mould 40 may be broken and removed, whereby a body 44 provided with an outer coating formed by the membrane 42, may be obtained. The said membrane 42 may, for example, be made from rubber or plastics materials.

FIG. 26 shows a gear comprising a hub part 45 and a rim part 46 having outer teeth 47. The hub part 45 and the rim part 47 may be arranged concentrically in a suitable mould, not shown, and a basic material, such as DSP material, may then be poured into the mould so as to form a part 48 interconnecting the hub and rim parts of the gear. In order to obtain a proper force transmissive engagement between the parts 45, 46, and 48, the hub part 45 may be provided with outer teeth 49 and the rim part 46 may be provided with inner teeth 50.

FIG. 27 shows a fragment of a gear with a modified toothed metal rim part 46 which has a substantially uniform wall thickness, and which may be made from sheet metal.

FIG. 28 shows a further embodiment of the gear, where the rim part 46 has been replaced by small metal plates 51 forming the tooth flanks of the gear. These metal plates 51 may, for example, be prefabricated by casting or sintering, and, subsequently, the are positioned in a suitable mould in which the gear is formed or moulded from DSP material or a similar concrete material. It should be understood that other types of large machine parts may advantageously be made in a similar manner by combining metal, such as steel, and DSP material. By this technique, it is possible to make larger machine elements which may, for example, be provided with surface parts defined by sintered carbide at positions where it is desired to obtain increased wear resistance.

FIG. 29 is a diagrammatic magnified sectional view of the outer surface of a body 52 which has been moulded from DSP-material or another concrete-like material by a conventional moulding technique. Upon solidification, the relatively rough outer surface of the body 52 has been provided with a layer or coating 53 of metal or another material. It is understood that in order to obtain a smooth outer surface of the layer 53, it is necessary to apply a rather thick layer or coating to the surface of the body 52.

FIG. 30 shows a similar sectional view of a coated body surface. In this case, the metal layer or coating 53 has been applied to the outer surface of a mould member, for example the one designated by 13 and 20 in FIGS. 1 and 5, respectively. The body 52 has then been moulded against this metal layer, whereupon the mould member has been removed. By such method, it is possible to obtain a smooth outer surface by using a very thin layer or coating 53.

When DSP material is moulded against a surface defined by a metal layer or coating, it is possible to obtain a relatively good bond even when the metal layer or coating is very thin. This is due to the fact that DSP-material is able to fill even very small cavities in the surface defined by the metal layer or coating.

However, in some cases it may be desirable to improve the bond between a metal layer or coating 53 and a basic material such as DSP material which is moulded against such layer. FIG. 31 illustrates a mould member 54 and a metal layer or coating 53 applied thereto. Before a DSP material is moulded against the surface defined by the coating 53, a bond-improving substance 55 may be applied to the exposed surface of the coating 53. In FIG. 32, the bond-improving substance 55 has been replaced by anchoring means in the form of a wire mesh 56 having transversely extending anchoring members 57. The wire mesh 56 may be positioned on the mould member 54 before applying the metal coating 53 thereto so that the wire mesh becomes partly embedded in the metal coating 53.

FIG. 33 illustrates a further method by means of which anchoring means in the form of staple fibers 58 may be embedded in the metal coating 53 and the adjacent part of the body 52 so as to extend across the interface therebetween. The fibers 58 may be embedded in a layer or tape 59 of an easily evaporatable material. This tape may be placed on the mould member 54, and when the metal layer or coating 53 is subsequently applied thereto by a spraying device, the easily evaporatable material may evaporate and disappear. However, the metal layer or coating 53 will maintain the fibers 58 in the desired position. When a basic material is cast against the exposed surface of the metal coating 53, the extending parts of the fibers 58 will become embedded in the basic material, so that an excellent bond between the basic material and the metal coating may be obtained.

It should be understood that in the moulding methods described above, the metal layer or coating may be replaced by a coating of any other desired material, such as glass or ceramics, which may impart the desired surface characteristics to the body surface in question.

In the embodiment described above, the metal coating or layer is transferred to the body surface by an indirect technique. However, it is also possible to apply a surface-improving coating or layer directly to a prefabricated body or object moulded from DSP material. In such case it may be advantageous to modify the surface characteristics of the body in order to make it better suited for receiving the metal coating. Thus, particles having desired thermal electrical or chemical properties may be added to the DSP material before it is moulded. As an example, electrically conductive particles may be incorporated in the material in order to improve electro deposition of a metal coating, or ultrafine particles of titanium carbide may be cast into the surface layer of the body as a nucleation site for a coating of titanium carbide, whereby a desired fine structure may be achieved. Similar techniques may be used in connection with indirect application of the metal coating.

Figure 35:
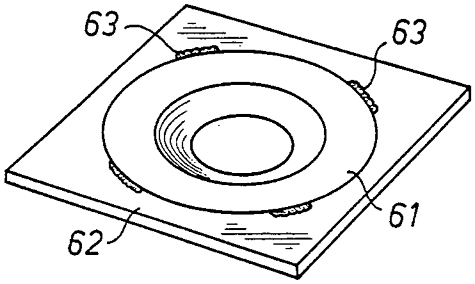
Figure 36:
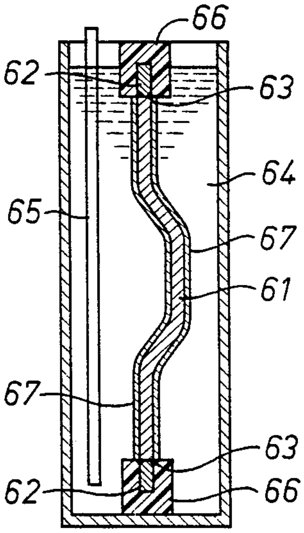

FIG. 34 shows a dish-shaped member 61 which may be a model made from andy suitable material, such as wood or plastic, or a metal member made from sheet metal. When it is desired to reproduce the model 61 from sheet metal by a drawing process, the model 61 is surrounded by a frame member 62 having an opening in which the model 61 is placed as shown in FIG. 35. The model 61 and the frame member 62 may then be joined, for example by welding 63, gluing, or by any other suitable means. The surface part of the frame member 62 is then covered by a masking member 66 made from an electrically insulating material, and, in case the model 61 is made from a non-conductive material, the surface parts thereof are coated with an eletrically conductive layer.

To effect the depositing of a layer of metal, such as nickel, on the oppositely arranged, exposed surface parts of the model 61, the unit comprising the model 61, the frame member 62, and the masking member 66 are arranged in a bath of an electrolyte, whereupon an electrical potential difference is established between the exposed surfaces of the model 61 and an electrode 65 which is dipped into the electrolyte, whereby a layer 67 of nickel or another metal may be deposited on the oppositely arranged, exposed surfaces of the model 61 in a manner known per se.

Figure 37:
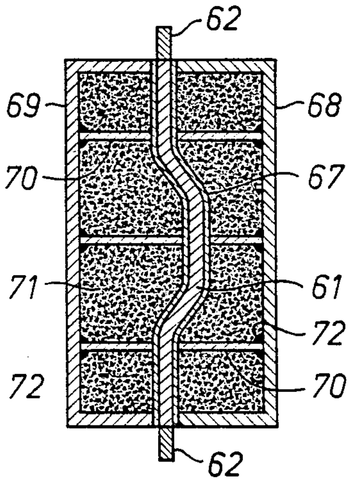
Figure 38:
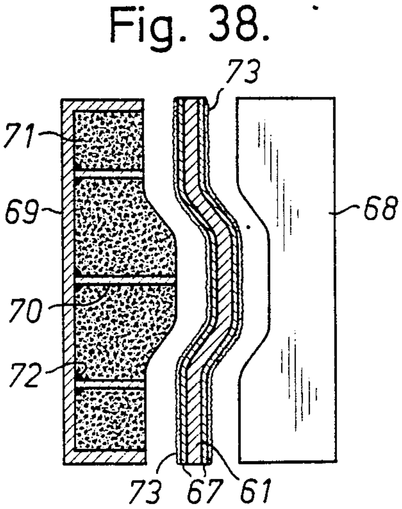
Figure 39:
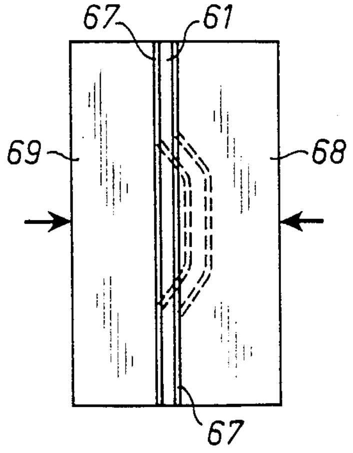

When the metal layers 67 deposited on the model 61 have obtained a suitable thickness, the model is removed from the bath 64, and the masking member 66 is removed from the model. A release agent, such as wax, is now sprayed onto the metal-coated opposite surfaces of the model 61, which is then placed in an upright position between the two parts 68 and 69 of a casting container as shown in FIG. 37, and the model 61 is supported in this position by supporting members 70. These supporting members 70 are fastened to opposite side walls of the casting container, for example by weldings 72, and their free ends are in contact with the outer metal layers 67 of the model 61. DSP material 71 is now poured into the cavities defined within the casting container on both sides of the model 61. After curing of the DSP material, the two parts 68 and 69 of the casting container may be separated from the metal-coated model 61. The outer surfaces of the metal layers 67 on the model 61 and the complementary surface parts of the cast DSP material are then cleaned so as to remove residual release agent therefrom. Layers 73 of a suitable strong adhesive may now be applied to the outer surfaces of the metal layers 67 on the model 61 and/or the complementary surface parts of the DSP material, whereupon the metal-coated model 61 may be reinserted between the container parts 68 and 69 as shown in FIG. 38. The container parts 68 and 69 may now be pressed against the opposite surfaces of the model 61 as indicated by arrows in FIG. 39, and this pressure may be maintained till the adhesive has cured and the metal layers or shells 67 have been permanently fastened to the complementary surface parts of the DSP material. When the container parts 68 and 69 are separated, the metal layers or shells 67 are separated from the model 61 which may now be removed.

The container parts 68 and 69 having complementary metal-coated surface parts may now be used as female and male tool parts of a pressing tool which may be used for making dish-shaped members identical to the member 61 shown in FIG. 34, from a plane blank sheet metal by a drawing process.

The materials used in the examples were as follows:

Cement: Low alkali sulphate resistant Portland cement.

Silica dust: Fine spherical $SiO_2$-rich dust (condensed silica fume). Specific surface (determined by BET technique) about 250,000 $cm^2/g$, corresponding to an average particle diameter of 0.1 $\mu$m.

Mighty: A so-called concrete superplasticiser, sodium salt of a highly condensed naphthalene sulphonic acid/formaldehdye condensate, of which typically more than 70% consist of molecules containing 7 or more naphthalene nuclei. Density about 1.6 $g/cm^3$. Available either as a solid powder or as an aqueous solution (42% be weight of Mighty, 58% by weight of water). (Available under the trademark Cem-Mix ® from Aalborg Portland-Cement-Fabrik, Denmark.)

Bauxite: Refractory grade calcined bauxite, size 0–1 mm, about 85% $Al_2O_3$, bulk density 3.32 $g/cm^3$.

Water: Common tap water.

EXAMPLE 1

A layer of gold was applied to the outer surface of a cylindrical cup of PMMA in a DC sputtering system ("Hummer I"). The diameter of the plastic cup was 26 mm, and the height of the cup was 60 mm. The thickness of the gold layer was estimated to be 500 Å based on the depositing time (6 minutes on each "surface") and on the current intensity which was 10 mA. The cup coated with gold was placed coaxially in another plastic cup with diameter of 52 mm and a height of 52 mm, and mouldable DSP mortar with the following composition:

Low alkali cement; 75.0 g
Ultra fine silica; 15.0 g
Mighty (dry); 1.2 g
Quartz sand 0–0.25 mm; 26.2 g
Quartz sand 0.25–1.0 mm; 82.6 g
Water; 18.0 g was mixed in a Hobart laboratory mixer for 15 minutes and obtained a low viscosity. The mixture was poured into the annular space defined between the plastic ups with light vibration, whereupon the cups with the DSP material were stored in a closed container at 20° C. for 3 days. The outer cup was then removed, and the extending part of the inner cup was cut off. Then, the moulded tubular DSP member with the inner plastic cup was immersed and left in chloroform for 2 ½ hours at 20° C. without stirring, whereby the inner plastic cup was dissolved.

The resulting tubular member showed a very smooth inner surface evenly coated with gold, and it was found that the adherence between the gold layer and the underlying DSP layer was perfect.

EXAMPLE 2

Cooperating male and female parts of a pressing tool were made in the manner described above with reference to FIGS. 34–39 by using a model as that shown in FIG. 34 made from steel plate. The outer diameter of the circular, dish-shaped model was 70 cm, and the model was provided with a depression substantially shaped as a truncated cone with a maximum diameter of 45 mm and a minimum diameter of 30 mm. The depth of the depression or the axial height of the truncated cone was 5 mm. The model was provided with a rectangular frame member made from steel plate with the same thickness as that of the model, and the outer dimensions of the frame member were 100×125 mm.

The model was electroplated with nickel by a method corresponding to the method described in "Oberfläche", 30, 1976, pp. 69–74, so as to provide metal layers with a thickness of 0.5 mm on the opposite surfaces of the model. The nickel layers or shells had such a low adherence to the model that they could later be separated therefrom as demonstrated in "Oberfläche" (loc.-cit.).

The model and the attached shells were placed in a casting container. Wax was sprayed onto the metal-coated surfaces of the model, which was subsequently placed in a casting container lie that described in connection with FIG. 37. DSP material was then poured into the cavities of the casting container as described in Example 1. The DSP material had the following composition:

Low alkali cement; 950 g
Ultrafine silica; 209 g
Refractory grade;
bauxite; 1155 g
Mighty (dry); 20 g
Water; 233 g When the DSP material had cured, the container parts were separated, and the wax was removed from the metal-coated surfaces of the model and the complementary surface parts of the DSP material.

Araldite® AW 106 (a two component epoxy resin glue), setting type HW 953 U, was used for fastening the metal layers to the DSP surfaces, and during hardening of the adhesive a pressure as that recommended for the Araldite-type in question was applied.

The finished press tool was tested in a press operating at a total compression force of 20 tonnes, and 170 samples as that shown in FIG. 34 were produced from plane blanks of steel plate by a drawing process. The samples produced with perfect, and the tool showed no signs of wear.

We claim:

1. A method of providing a metal coated article of a mold, tool or machine part which comprises forming a metal layer of a desired shape and molding a basic composition against said metal, thereby bonding said molded article to said metal layer, said basic composition comprising (A) inorganic particles of a size of from about 50 Å to about 0.5 u, (B) solid particles having a size of the order of 0.5–100 u, and being at least one order of magnitude larger than the respective particles stated under (A), and (C) compact-shaped solid particles of a material having a strength exceeding that of ordinary sand and stone used for ordinary concrete, typically a strength corresponding to at least one of the following criteria:

(1) a die pressure of about 30 MPa at a degree of packing of 0.70, above 50 MPa at a degree of packing of 0.75, and above 90 MPa at a degree of packing of 0.80, (on particles of the material having a size ratio between the largest and smallest particle substantially not exceeding 4 mm), (2) a compressive strength of a composite material with the particles embedded in a specified matrix exceeding 170 MPa (in case of a substantial amount of the particles being larger than 4 mm) and 200 MPa (in case of substantially all particles being smaller than 4 mm), (3) a Moh's hardness (referring to the mineral constituting the particles) exceeding 7 and (4) a Knoop indentor hardness (referring to the mineral constituting the particles) exceeding 800, said particles having a size of 100 u–0.1 m, a liquid, and a surface-active dispersing agent, the particles (A) being homogeneously distributed in the voids between particles (B) and optionally (D) additional bodies which have at least one dimension which is at least one order of magnitude larger than the particles (A), with the proviso that when additional bodies D are not present or are present and consist of sand and/or stone, at least 20% by weight of the particles B are Portland cement particles.

2. A method according to claim 1 wherein said molding is carried out at about room temperature.

3. A method according to claim 1 wherein said layer is a layer of metal foil.

4. A method according to claim 1 wherein a metal layer is preformed by electroplating a surface of a mold, applying an adhesive to said metal, filling a mold with said basic material, and hardening said basic material and said adhesive to thereby bond said shaped material to said metal.

5. A method according to claim 1 wherein a mold is coated with a metal layer, the mold placed in a casting container, wax applied to the metal, the basic material added to said casting container, cured, the wax removed from the metal, an adhesive applied to the cast article and the metal layer adhered to said cast article.

* * * * *

UNITED STATES PATENT AND TRADEMARK OFFICE
CERTIFICATE OF CORRECTION

PATENT NO. : 4,923,665

DATED : May 8, 1990

INVENTOR(S) : ARNE ANDERSEN ET AL

It is certified that error appears in the above-identified patent and that said Letters Patent is hereby corrected as shown below:

Column 2, line 40, change "(4)" to read --4)--.

Column 4, line 48, change "(4)" to read --4)--.

Column 4, line 49, after "scribed" insert --in--.

Column 23, lines 27-28 and 29-30, change "composition" to --material--

Column 23, line 32, change "u," to read --μm,--.

Column 23, line 34, change "u," to read --μm,--.

Column 24, line 4, change "4 mm," to read --4),--.

Column 24, line 15, change "u-0.1" to read --μm-0.1--.

Signed and Sealed this

Eleventh Day of June, 1991

*Attest:*

HARRY F. MANBECK, JR.

*Attesting Officer* — *Commissioner of Patents and Trademarks*